(12) United States Patent
Elgersma et al.

(10) Patent No.: US 9,547,991 B2
(45) Date of Patent: Jan. 17, 2017

(54) AIRCRAFT PRECISION APPROACH AND SHIPBOARD LANDING CONTROL SYSTEM AND METHOD

(71) Applicant: HONEYWELL INTERNATIONAL INC., Morristown, NJ (US)

(72) Inventors: Michael Ray Elgersma, Plymouth, MN (US); Xiaohong Linda Li, Plymouth, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 13/901,089

(22) Filed: May 23, 2013

(65) Prior Publication Data

US 2014/0350754 A1    Nov. 27, 2014

(51) Int. Cl.
| | | |
|---|---|---|
| *G06F 19/00* | (2011.01) |
| *G06G 7/70* | (2006.01) |
| *G08G 5/02* | (2006.01) |
| *G05D 1/06* | (2006.01) |
| *G05D 1/12* | (2006.01) |
| *B64F 1/00* | (2006.01) |
| *G05D 1/00* | (2006.01) |
| *B64C 13/16* | (2006.01) |

(52) U.S. Cl.
CPC ............ *G08G 5/025* (2013.01); *G05D 1/0684* (2013.01); *B64C 13/16* (2013.01); *B64F 1/00* (2013.01); *G05D 1/00* (2013.01); *G06F 19/00* (2013.01); *G06G 7/70* (2013.01); *G08G 5/02* (2013.01)

(58) Field of Classification Search
CPC ........ G08G 5/025; G08G 5/02; G05D 1/0676; G05D 1/00; B64F 1/00; B64F 13/16; G06F 7/70; G06F 19/00

USPC .............................................. 701/16; 244/183
See application file for complete search history.

(56) References Cited

U.S. PATENT DOCUMENTS

| | | |
|---|---|---|
| 5,000,404 A | 3/1991 | Martorella |
| 5,235,513 A | 8/1993 | Velger et al. |
| 5,968,106 A | 10/1999 | DeVlieg et al. |
| 5,991,691 A | 11/1999 | Johnson |

(Continued)

FOREIGN PATENT DOCUMENTS

WO    WO 2011114324 A1 *   9/2011

OTHER PUBLICATIONS

English Translation of WO2011114324.*

(Continued)

*Primary Examiner* — Helal A Algahaim
*Assistant Examiner* — Mahmoud Ismail
(74) *Attorney, Agent, or Firm* — Lorenz & Kopf, LLP

(57) ABSTRACT

A system and method of generating a landing trajectory for use in landing an aircraft onto a deck of a waterborne ship includes sensing motion of the ship, and sensing wind speed and wind direction. The sensed motion of the ship is processed to generate estimates of ship attitude and vertical speed, and the sensed wind speed and wind direction are processed to generate estimates of air-wake disturbances ahead of the aircraft. The landing trajectory is generated based on the estimates of ship attitude and vertical speed and the estimates of air-wake disturbances. The system and method implement model predictive control to calculate the control maneuvers multiple steps ahead, which provides the capability to smoothly control the timing of the aircraft touchdown phase.

18 Claims, 3 Drawing Sheets

(56) References Cited

U.S. PATENT DOCUMENTS

| | | | |
|---|---|---|---|
| 6,064,924 A * | 5/2000 | Fleischmann | 701/16 |
| 6,332,105 B1 | 12/2001 | Calise et al. | |
| 6,711,479 B1 | 3/2004 | Staggs | |
| 7,206,698 B2 | 4/2007 | Conner et al. | |
| 7,373,242 B2 | 5/2008 | Yamane | |
| 7,970,498 B2 | 6/2011 | Sahasrabudhe et al. | |
| 8,000,847 B2 | 8/2011 | Shue | |
| 8,014,909 B2 | 9/2011 | Builta et al. | |
| 8,141,823 B2 | 3/2012 | Hursig et al. | |
| 8,234,021 B2 | 7/2012 | Colclough | |
| 2011/0006164 A1 | 1/2011 | Martensson et al. | |
| 2011/0118910 A1 * | 5/2011 | Geoffroy et al. | 701/16 |

OTHER PUBLICATIONS

Svitak LeBourget et al.; Unmanned Systems, Hit the Deck, European manufacturers of maritime UAS take on high-seas operability challenges; Aviation Week 7 Space Technology/Nov. 5/12, 2012.

* cited by examiner

AIRCRAFT PRECISION APPROACH AND SHIPBOARD LANDING CONTROL SYSTEM AND METHOD

TECHNICAL FIELD

The present invention generally relates to landing of an aircraft on the deck of a ship, and more particularly relates to a system and method for providing precision approach and shipboard landing control.

BACKGROUND

Landing an aircraft on the deck of a ship can be a challenging operation, even for the most experienced pilots. The unexpected and changing nature of the shipboard air-wake and ship motion can impose significant hazards and limitations in these operations.

Ship operators can, of course, implement maneuvers to improve the overall safety of aircraft landing operations during adverse conditions. For example, ship motion can be reduced by changing the ship heading relative to the waves and/or by changing ship speed. However, these maneuvers result in larger ship heading changes or larger ship speed changes than necessary, and sometimes these maneuvers may not provide the desired result. Moreover, launch and recovery envelopes are prescribed for specific aircraft types on different ship classes. These launch and recovery envelopes are often initially very restrictive, and the flight testing needed to expand the envelopes is frequently difficult to schedule, relatively expensive, and potentially hazardous. Currently, the launch and recovery wind limits and air operation envelopes are primarily determined via the subjective analysis of test pilots, using a time consuming and potentially risky iterative flight test build-up approach.

Hence, there is a need for a system and method that provides precision approach and shipboard landing control that does not rely on changes in ship heading and/or speed to alleviate the impact of adverse landing conditions and/or restrictive operational envelopes. The present invention addresses at least these needs.

BRIEF SUMMARY

In one embodiment, a method of generating a landing trajectory for use in landing an aircraft onto a deck of a waterborne ship includes sensing motion of the ship, and sensing wind speed and wind direction. The sensed motion of the ship is processed to generate estimates of ship attitude and vertical speed, and the sensed wind speed and wind direction are processed to generate estimates of air-wake disturbances ahead of the aircraft. The landing trajectory is generated based on the estimates of ship attitude and vertical speed and the estimates of air-wake disturbances.

In another embodiment, a system for generating a landing trajectory for use in landing a rotorcraft onto a deck of a waterborne ship includes a motion sensor, a wind sensor, and a processor. The motion sensor is configured to sense motion of the ship and supply motion data representative thereof. The wind sensor is configured to sense wind speed and wind direction and supply wind data representative thereof. The processor is coupled to receive the motion data and the wind data and is configured, upon receipt thereof, to generate estimates of ship attitude and vertical speed, generate predictions of air-wake disturbances ahead of the rotorcraft, and generate the landing trajectory based on the estimates of ship attitude and vertical speed and the predictions of air-wake disturbances.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
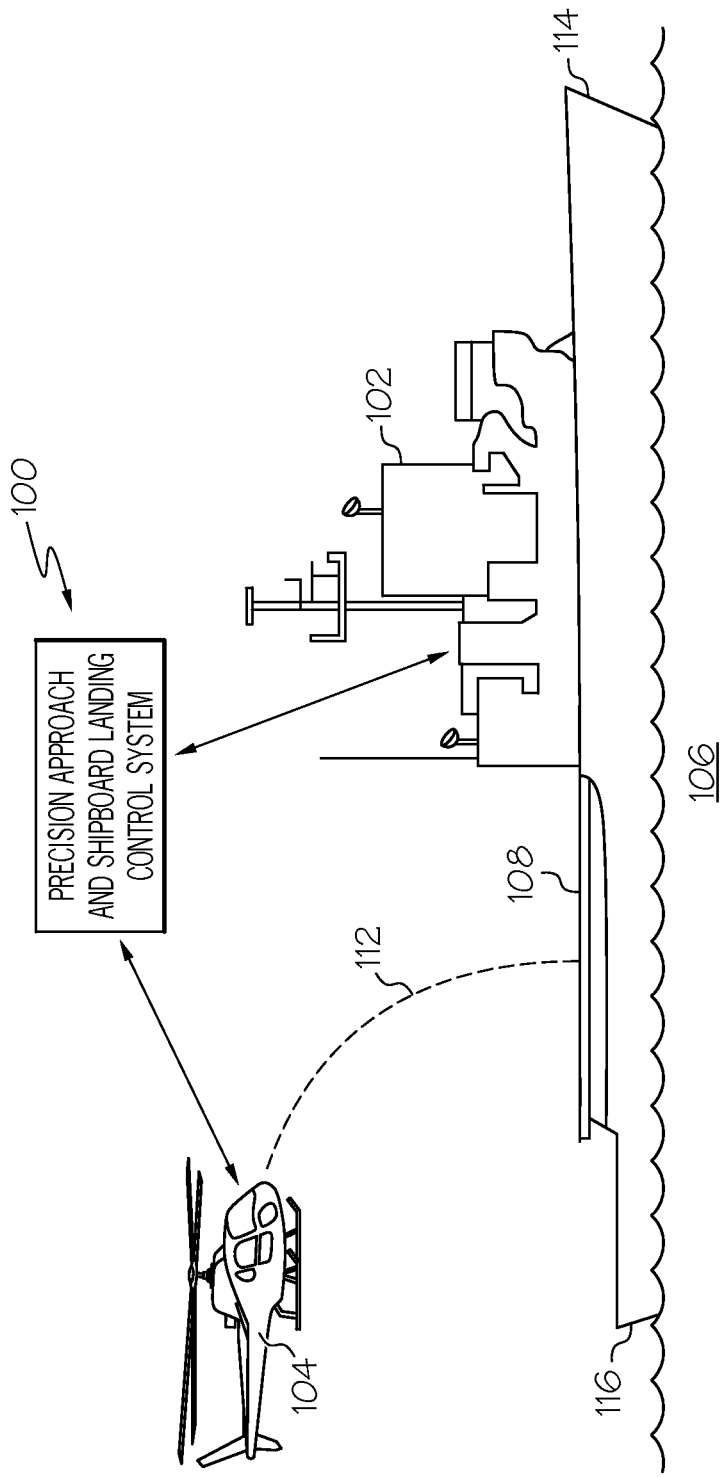
FIG. 1 depicts a representation of an aircraft attempting to land on the landing deck of a waterborne ship.

Referring to FIG. 1, a ship 102 and an aircraft 104 are depicted. The ship 102, which is depicted as being waterborne and traversing a body of water 106, includes a landing deck 108 that is configured to allow various aircraft, such as a rotorcraft, to land thereon. The ship 102 may be any one of numerous types of watercraft, which may be commercial, military, privately, or publicly owned, that include a suitable landing deck 108. The aircraft 104 may be any one of numerous types of aircraft now known or developed in the future. For example, the aircraft 104 may be fixed-wing aircraft, a manned or unmanned rotary-wing aircraft, or it may be any one numerous types of unmanned air vehicles (UAVs). In the depicted embodiment, the aircraft 104 is a rotorcraft.

No matter how the ship 102 and rotorcraft 104 are specifically implemented, and as FIG. 1 further depicts, a precision approach and shipboard landing control system 100 is also provided. This system 100 is depicted apart from, but in functional communication with, both the ship 102 and the rotorcraft 104 because the system 100 may be disposed partially within the ship 102 and the rotorcraft 104, or entirely within the rotorcraft 104. No matter where it is physically disposed, the system 100, which will now be described, is configured to generate a landing trajectory 112 for use in landing the rotorcraft 104 onto the deck 108 of the waterborne ship 102. As will also be described, the landing trajectory 112 may be automatically implemented by flight controls onboard the rotorcraft 104, or the landing trajectory 112 may be rendered on a display device for implementation by a pilot (either onboard the rotorcraft 104 or remote therefrom).

Figure 2:
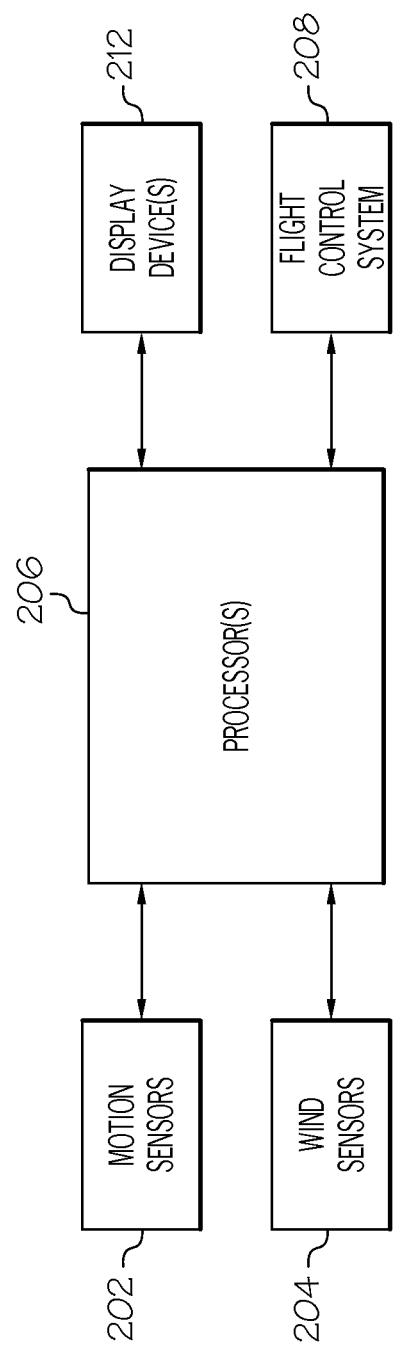
FIG. 2 depicts a functional block diagram representation of one embodiment of a precision approach and shipboard landing control system.

Turning now to FIG. 2, a functional block diagram representation of one embodiment of the precision approach and shipboard landing control system 100 is depicted. The depicted system 100 includes a plurality of motion sensors 202, a plurality of wind sensors 204, and a processor 206. The motion sensors 202, which for ease of illustration are depicted using a single functional block, are configured to sense motion of the ship and supply motion data representative thereof to the processor 206. The motion sensors 202 may be variously implemented and disposed. For example, the motion sensors 202 may be implemented using one or more inertial sensors, one or more global positioning system (GPS) sensors, one or more radar sensors, one or more cameras, or various combinations thereof, just to name a few. Moreover, the motion sensors 202 may be wholly disposed on the ship 102, wholly disposed on the rotorcraft 104, or partially disposed on both. In a particular preferred embodiment, the motion sensors 202 are wholly disposed on the rotorcraft 104, and include, for example, one or more cameras, a plurality of radar altimeters, and one or more inertial sensors. The camera is configured to capture images of the ship 106 and supplies image data to the processor 206. The radar altimeters are configured to sense vertical motion of the ship 102, and supply data representative thereof to the processor 206. As may be appreciated, the pitch and roll angles that the ship 102 may be experiencing may be estimated from the sensed vertical motion of the ship 102. The inertial sensor(s) is (are) configured to sense the position and orientation of the rotorcraft 104 and ship 102, and to supply data representative thereof to the processor 206.

The wind sensors 204, which are also depicted as a single functional block for ease of illustration, are configured to sense wind speed and wind direction and supply wind data representative thereof to the processor 206. The wind sensors 204 may also be variously implemented and disposed. For example, the wind sensors 204 may be implemented using one or more LIDAR air data sensors, one or more anemometers, one or more pitot tubes, one or more pressure sensors, one or more flow sensors, or various combinations, just to name a few. The wind sensors 112, like the motion sensors 108, may be wholly disposed on the rotorcraft 102, wholly disposed on the ship 106, or partially disposed on both. In the depicted embodiment, the wind sensors 108 are partially disposed on the ship 102 and partially disposed on the rotorcraft 104.

The processor 206 is configured, upon receipt of the motion data from the motion sensors 202, to determine ship attitude and vertical speed. The processor 206 is additionally configured, upon receipt of the wind data from the wind sensors 204, to generate estimates of air-wake disturbances ahead of the rotorcraft 104. The processor 206 is additionally configured, based in part on the determined ship attitude and vertical speed and the predicted air-wake disturbances, to generate a landing trajectory 112 for the rotorcraft 104. In one embodiment, which will be described momentarily, the processor 206 is configured to continuously generate a plurality of potential landing trajectories, and to continuously select a preferred landing trajectory from the plurality of potential landing trajectories. The preferred landing trajectory 112 is one in which the rotorcraft 104 will touchdown on landing the deck 108 when ship attitude is relatively level and ship vertical speed is at or near zero. The preferred landing trajectory 112 will also avoid as much of the ship's air-wake as possible. These conditions significantly reduce the likelihood of a dynamic rollover of the rotorcraft 104, as well as reduce its sink rate.

The landing trajectory 112 that the processor 206 generates may be supplied, as flight control commands, to the rotorcraft flight control system 208, as image rendering display commands to one or more display devices 212, or both. In some embodiments, the flight control system 208 is configured, upon receipt of the flight control commands, to automatically fly the rotorcraft 104 along the landing trajectory 112. In other embodiments, the processor 206 may additionally supply image rendering display commands to the one or more display devices 212 that cause the one or more display devices 212 to render an image of the landing trajectory 112. In still other embodiments, the processor 206 may only cause the one or more display devices 212 to render an image of the landing trajectory 112. In these embodiments, the pilot will manually control the rotorcraft 104 to fly the landing trajectory 112.

As just noted, the rotorcraft 104 will preferably touchdown when the attitude of the ship 102, and thus the landing deck 108, is relatively level, and when the vertical speed of the ship 102 is either constant or relatively small (e.g., near zero). The ship 102 will be relatively level and have a nearly zero vertical speed when it is either at the crest (top) or the trough (bottom) of a wave. Thus, the system 100 may be configured to generate a landing trajectory 112 that will provide a touchdown coincident with either of these events. In relatively high sea states, however, it is noted that just after the ship 102 passes the crest of a relatively large wave, the bow 114 (see FIG. 1) of the ship 102 may slam down in the water 106. To avoid this transient, the system 100 is preferably configured to generate a landing trajectory 112 that will provide a touchdown when ship attitude is relatively level and vertical speed is near zero at the trough of a wave.

Small ships usually have the landing deck 108 at or near the stern 116 (see FIG. 1) of the ship 102. As a result, the vertical speed of the landing deck 108 is equal to the vertical speed of the center of the ship 102 plus the ship angular rate times the lever arm from the center of the ship 102 to the landing deck 108. This results in upward motion of the landing deck 108 when the ship center of gravity (CG) is at the crest of a wave, and results in downward motion of the landing deck 108 when the ship CG is near the trough of a wave. Thus, to avoid hitting an edge of the ship 102, the landing trajectory 112 is preferably a shallow glide-path followed by a more steep descent during the last few seconds before touchdown. The landing trajectory 112 is chosen so that the rotorcraft 104 touches down on the landing deck 108 just before the ship 102 reaches the trough of a wave, but if the ship 102 deviates from its expected motion during the last few seconds before the rotorcraft 104 touches down, then the rotorcraft 104 needs to pull up quickly and attempt to land at the trough of the next wave.

To make the above-described determinations regarding ship attitude and vertical speed, the processor 206, at least in the depicted embodiment, implements known wave models and ship characteristics. For example, the processor 206 may implement a wave model based on the well-known Pierson-Moskowitz spectra. Regarding the ship 102, it is generally known that the heave, pitch, and roll dynamics of a ship 102 are determined by the time constants of the ship relative to the time constants of the waves. If the ship 102 time constants are faster than the wave time constants, then the ship 102 will ride the waves like a buoy. If the ship time constants are slower than the wave time constants, then the ship 102 remains relatively motionless in the waves.

Regardless of the particular models that are implemented, the processor 206 will fit one or more sine waves to the ship attitude and position versus time. The processor 206 will identify the time window where ship attitude is nearly level and the ship 102 is at its lowest position. The period and phase of the one or more fitted sine waves is then used to predict when the ship will be at the trough of the next wave, and the landing trajectory 112 will be timed to touchdown when the ship 102 is near that next wave trough.

As was also noted above, the processor 206 is additionally configured, upon receipt of the wind data from the wind sensors 204, to generate estimates of air-wake disturbances ahead of the rotorcraft 104. More specifically, the processor 114 is configured, upon receipt of the wind data, to estimate local air-wake disturbances and to predict air-wake disturbances ahead of the rotorcraft 102, along the plurality of potential landing trajectories. To generate the estimates of air-wake disturbances ahead of the rotorcraft 104, the processor 206, at least in the depicted embodiment, implements what is referred to herein as an air-wake estimator. For completeness, an embodiment of the air-wake estimator will now be briefly described.

Figure 3:
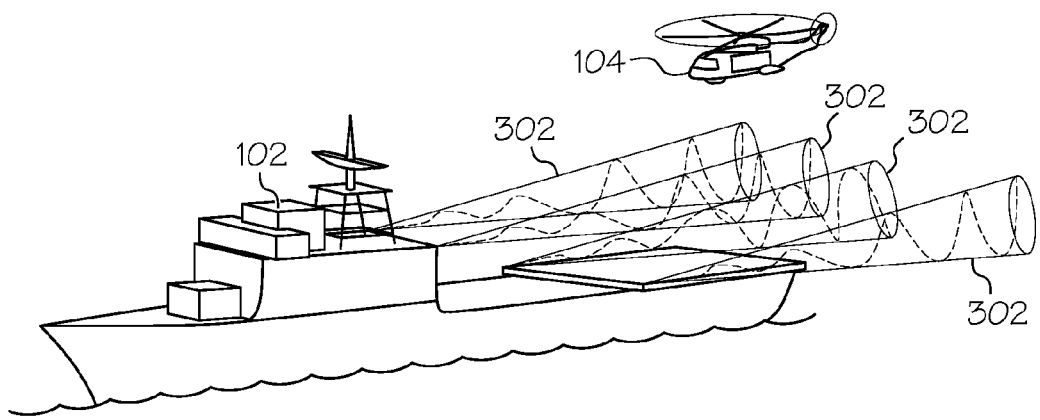
FIG. 3 depicts a simplified representation of air-wake disturbances that may be generated by a waterborne ship.

It is generally known that wind deflects air around a ship superstructure, generating air-wake disturbances in the downwind direction. As depicted in FIG. 3, these air-wake disturbances 302 are typically located at the edges and corners of the ship structure. In order to avoid the largest angular and translational transients associated with air-wake disturbances, the processor 206 will estimate the location of nominal air-wake disturbances 302, such as those depicted in FIG. 3, using wind data supplied from wind sensors 204 on board the ship 102 to supply information that is generally known as the wind-over-deck (WOD) speed and direction. The sensed WOD, together with existing 3-D Computation Fluid Dynamics (CFD) data, provide a relatively good initial estimate of the distributed values of the nominal air-wake disturbances 302 and the locations of the largest disturbance. The locations and directions of these disturbances 302 can change if the direction of the WOD changes. Unfortunately, the wind sensors 204 onboard the ship 102 and CFD study cannot provide sufficiently accurately estimates continuously in real-time. Thus, the air-wake estimator will provide data both as dynamic states and spatial distribution estimations to adjust the landing trajectory 112 accordingly.

The air-wake estimator, using known technologies, and with the initial estimate of the locations of the nominal air-wake disturbances as initial conditions, continuously estimates local air-wake disturbances adjacent to the rotorcraft 104, and predicts the locations of down-range air-wake disturbances along the plurality of trajectories. The air-wake estimator is implemented using model predictive control and extended Kalman filter technology to provide relatively fast and smooth flight dynamic responses.

The model predictive control calculates the control maneuver multiple steps ahead (e.g., control horizon). The commands are designed with anticipated air-wake and anticipated trajectory. Therefore, the response of the system provides improved performance in terms of being "less sensitive" to air-wake disturbance, and generating less overshoot due to aggressive maneuvering around ship corners/edges. This look-ahead predictive control is applied both in air-wake disturbance rejection, landing touchdown control maneuvers, and slope deck attitude protection with and without crosswinds.

The model predictive control methodology has inherent control constraints, state and output constraints in the formulation of the control law. Those constraints are applied via attitude and rate limits to help address landing dynamic rollover controls problem. Thus, the predictive ship motion model and wind speed estimation provide anticipated inputs and anticipated external disturbance, and the control law calculates the "look-ahead" control before the actual commanded maneuver is executed. This provides the capability to smoothly control the timing of the aircraft touchdown phase.

As previously noted, the processor 206 is configured to continuously generate a plurality of potential landing trajectories, and to continuously select a preferred landing trajectory from the plurality of potential landing trajectories. In one embodiment, the processor 206 may generate around a dozen potential landing trajectories, giving two flight-path angle values and six heading values for the glide path. The trajectory that is furthest from an estimated air-wake disturbance will preferably be selected.

Figure 4:
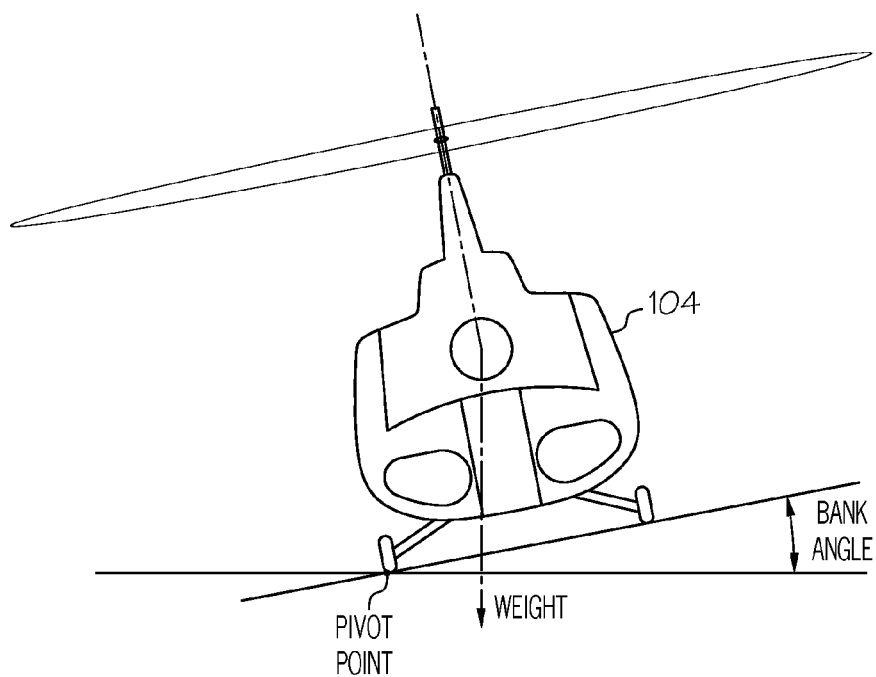
FIG. 4 depicts a front view of a rotorcraft touching down with a bank angle.

Rotorcraft pilots can control the bank angle of the rotorcraft 104 to avoid drifting sideways in a wind, resulting in one skid touching the landing deck 108 before the other. As depicted in FIG. 4, the bank angle can place the helicopter in a situation where it is pivoting about a skid at the landing deck contact point. With an excessive roll rate, a critical bank angle may be reached where a dynamic roll may occur. This potentially becomes more prevalent when landing in cross winds on slope surfaces, such as the landing deck 108 of a ship 102. Thus, in addition to the above, the system 100 is configured to control the movements of the rotorcraft flight controls to keep the proper trim and adjust the roll rate using attitude envelope protection control. This attitude envelope protection control uses restricted roll attitude commands with rate inner loop feedback control to adjust the helicopter control surfaces and thrust power. As with the generation of the landing trajectory 112, the rotorcraft flight control system 208 may be automatically controlled to keep the proper trim and adjust the roll rate.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A method of generating an approach and landing trajectory for use in landing an aircraft onto a deck of a waterborne ship, the method 5 comprising the steps of:
   using a motion sensor to sense motion of the waterborne ship;
   using a wind sensor to sense wind speed and wind direction;
   processing, in a processor, the sensed motion of the waterborne ship to generate estimates of ship attitude and vertical speed;
   processing, in the processor, the sensed wind speed and wind direction to generate estimates of air-wake disturbances ahead of the aircraft; and
   generating, in the processor, the approach and landing trajectory based on the estimates of ship attitude and vertical speed and the estimates of air-wake disturbances.

2. The method of claim 1, wherein:
   the step of processing the sensed wind speed and wind direction comprises estimating local air-wake disturbances adjacent to the aircraft;
   the step of generating the landing trajectory comprises generating a plurality of potential approach and landing trajectories; and
   the method further comprises predicting, in the processor, down-range air-wake disturbances along the plurality of potential approach and landing trajectories.

3. The method of claim 1, further comprising rendering the generated approach and landing trajectory on a display device disposed within the aircraft.

4. The method of claim 1, further comprising:
   using the processor to automatically control the aircraft to approach and land on the deck of the waterborne ship in accordance with the generated approach and landing trajectory.

5. The method of claim 4, wherein the aircraft comprises a rotorcraft, and the method further comprises:
   sensing a bank angle between the rotorcraft and the deck of the waterborne ship using the motion sensor;
   using the processor to automatically control the rotorcraft to maintain the bank angle within a predefined angle range.

6. The method of claim 5, wherein the step of automatically controlling the rotorcraft further comprises controlling sink rate of the rotorcraft.

7. The method of claim 1, wherein the step of processing the sensed wind speed and direction comprises supplying the sensed wind speed and direction to a model representative of ship superstructure design and air flow dynamics.

8. The method of claim 1, further comprising:
   processing, in the processor, the sensed motion of the waterborne ship and the sensed wind speed and wind direction; and
   continuously updating the generated approach and landing trajectory.

9. The method of claim 1, wherein:
   the waterborne ship has a center of gravity; and
   the method further comprises:
      using the processor to determine when the center of gravity of the waterborne ship is at a trough of a wave, and
      generating, in the processor, the approach and landing trajectory so that the aircraft touches down on the deck of the waterborne ship just prior to the center of gravity of the waterborne ship reaching the trough of a wave.

10. A system for generating an approach and landing trajectory for use in landing an aircraft onto a deck of a waterborne ship, the system comprising:
- a motion sensor configured to sense motion of the waterborne ship and supply motion data representative thereof;
- a wind sensor configured to sense wind speed and wind direction and supply wind data representative thereof; and
- a processor coupled to receive the motion data and the wind data and configured,
- upon receipt thereof, to:
  - generate estimates of ship attitude and vertical speed,
  - generate predictions of air-wake disturbances ahead of the rotorcraft; and
  - generate the approach and landing trajectory based on the estimates of ship attitude and vertical speed and the predictions of air-wake disturbances.

11. The system of claim 10, wherein the processor is further configured to:
- estimate local air-wake disturbances adjacent to the aircraft;
- generate a plurality of potential landing trajectories; and
- predict down-range air-wake disturbances along the plurality of potential approach and landing trajectories.

12. The system of claim 10, further comprising:
- a display device disposed within the aircraft and configured to receive image rendering display commands,
- wherein the processor is further configured to supply image rendering display commands to the display device that cause the display device to render the generated approach and landing trajectory.

13. The system of claim 10, wherein the processor is further configured to automatically control the aircraft to land on the deck of the waterborne ship in accordance with the generated approach and landing trajectory.

14. The system of claim 13, wherein:
- the aircraft comprises a rotorcraft;
- the motion sensor is further configured to sense a bank angle between the rotorcraft and the deck of the waterborne ship; and
- the processor is further configured to automatically control the rotorcraft to maintain the bank angle within a predefined angle range.

15. The system of claim 14, wherein processor is further configured to control sink rate of the rotorcraft.

16. The system of claim 10, wherein:
- the processor is further configure to implement a model representative of ship superstructure design and air flow dynamics; and
- the sensed wind speed and direction are supplied to the model.

17. The system of claim 10, wherein the processor is further configured to (i) process the sensed motion of the waterborne ship and the sensed wind speed and wind direction and (ii) continuously update the generated approach and landing trajectory.

18. The system of claim 10, wherein:
- the waterborne ship has a center of gravity; and
- the processor is further configured to (i) determine when the center of gravity of the waterborne ship is at a trough of a wave and (ii) generate the approach and landing trajectory so that the aircraft touches down on the deck of the waterborne ship just prior to the center of gravity of the waterborne ship reaching the trough of a wave.

* * * * *